(No Model.) 8 Sheets—Sheet 1.

G. WÜST-GUYER.
MACHINE FOR MAKING SCREWS, KNOBS, WASHERS, &c.

No. 459,558. Patented Sept. 15, 1891.

Fig. 1

Witnesses:
W. A. Johnston
B. C. Maloney

Inventor:
Gottfried Wüst-Guyer
By Paine & Ladd
atty.

(No Model.) 8 Sheets—Sheet 3.

G. WÜST-GUYER.
MACHINE FOR MAKING SCREWS, KNOBS, WASHERS, &c.

No. 459,558. Patented Sept. 15, 1891.

Witnesses: Inventor:

(No Model.) G. WÜST-GUYER. 8 Sheets—Sheet 4.
MACHINE FOR MAKING SCREWS, KNOBS, WASHERS, &c.

No. 459,558. Patented Sept. 15, 1891.

(No Model.)  8 Sheets—Sheet 5.

G. WÜST-GUYER.
MACHINE FOR MAKING SCREWS, KNOBS, WASHERS, &c.

No. 459,558. Patented Sept. 15, 1891.

Witnesses: Inventor:
Gottfried Wüst-Guyer
By Paine & Lord
attys.

(No Model.) G. WÜST-GUYER. 8 Sheets—Sheet 7.
MACHINE FOR MAKING SCREWS, KNOBS, WASHERS, &c.
No. 459,558. Patented Sept. 15, 1891.

Witnesses: Inventor:
Gottfried Wüst-Guyer
By Paine & Ladd
attys.

UNITED STATES PATENT OFFICE.

GOTTFRIED WÜST-GUYER, OF ZURICH, SWITZERLAND.

MACHINE FOR MAKING SCREWS, KNOBS, WASHERS, &c.

SPECIFICATION forming part of Letters Patent No. 459,558, dated September 15, 1891.

Application filed February 7, 1891. Serial No. 380,679. (No model.) Patented in Switzerland June 30, 1890, No. 2,555; in France July 12, 1890, No. 207,247; in Germany July 13, 1890, No. 55,439, and in Austria-Hungary October 11, 1890, No. 29,540 and No. 52,269.

*To all whom it may concern:*

Be it known that I, GOTTFRIED WÜST-GUYER, a citizen of Switzerland, residing at Unterstrass-Zürich, in the canton of Zurich and Republic of Switzerland, have invented certain new and useful Improvements in a Machine for the Manufacture of Screws, Knobs, Washers, and the Like, (for which I have obtained a patent in Switzerland, No. 2,555, dated June 30, 1890; in Germany, No. 55,439, dated July 13, 1890; in France, No. 207,247, dated July 12, 1890, and in Austria-Hungary, No. 29,540 and No. 52,269, dated October 11, 1890;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of machines for turning in which the object to be operated upon is held in a rotating hollow shaft and the gripping arrangement of which permits of a successive feeding of the object which is operated upon by tools arranged in a lateral position thereto.

My machine possesses specially-adapted gripping and feeding arrangements for the objects to be operated upon, and in particular a peculiar arrangement of the tools brought into operation revolver-like. The machine works in such a manner that the feeding of the object under operation takes place from time to time approximately to the length of the piece operated upon and cut off. The most essential tool, by each respective operation brought laterally against the object to be operated upon, is a tool commonly termed "revolver-tool," which automatically performs the different movements and the tool-head of which permits of using the simplest form of tools for a great variety of purposes. The machine facilitates the manufacture of screws, fancy-turned objects, such as acorn-shaped knobs, bolts, shot-exploders, washers, and the like articles.

In order that my invention may be more fully understood, I have caused to be appended hereunto three sheets of drawings, marked with letters of reference indicating like parts in the various figures.

Figure 1:
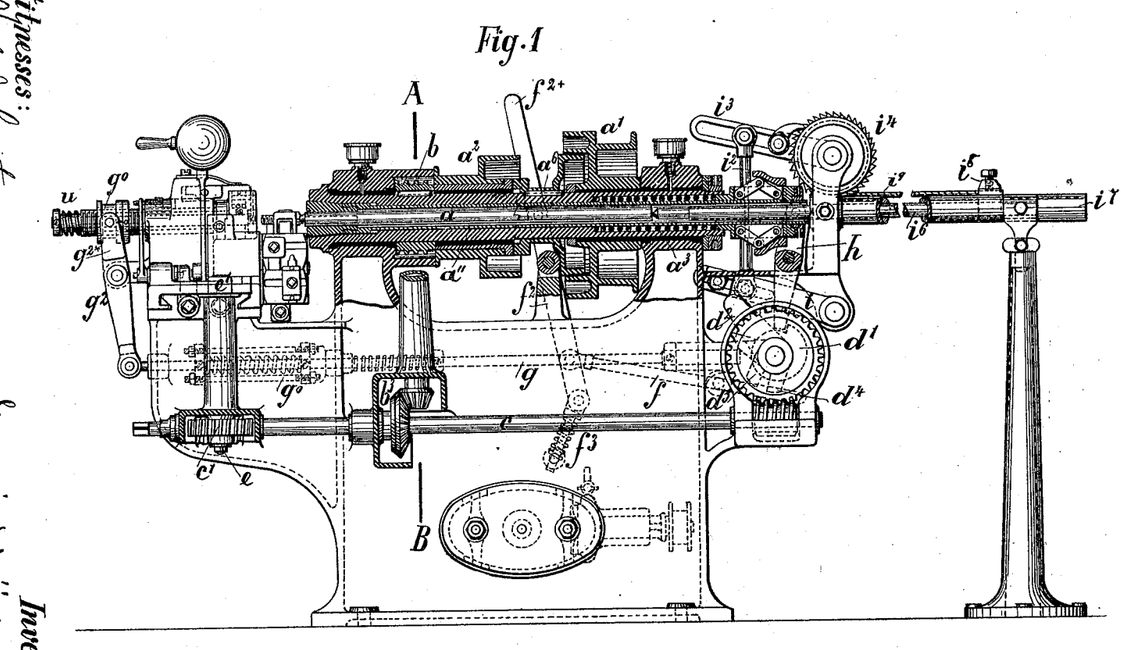
Figure 1, Sheet I, is partly a side view and partly a vertical section of the machine.

On the main spindle of the hollow shaft $a$ are positioned two loosely-revolving speed-pulleys $a'$ and $a^2$, (shown bushed in Fig. 1,) which are driven from a common counter-shaft. The larger $a'$ of the two pulleys $a'$ and $a^2$ serve for screw-cutting and the smaller one $a^2$, which runs in an opposite direction, for the turning operation and to disengage the screw-die. The friction coupling or clutch $a^6$ is keyed on the spindle $a$ and causes when moved into the pulley $a'$ a slow forward movement, and on the automatic reversing through the coupling or clutch lever $f^2$ and the moving of the coupling $a^6$ into the pulley $a^2$ a quick return movement of the screw-cutting tools $u$. On the spindle $a$ is also fixed the worm $b$, which by means of the worm-wheel $b'$, (connected with the shaft $b^2$ through clutch $b^4$,) bevel-wheel $b^3$, shaft $c$, worm-gearing $c'$ and $c^2$, eccentric-shaft $d$, having adjustable eccentrics $d'$ $d^2$ $d^3$ $d^4$ $d^5$, and shaft $e$, having an eccentric $e'$, sets in motion the whole of the feeding and reversing mechanism. By disengaging the clutch $b^4$ by means of its lever $b^5$ the feed and reversing motions and through disengaging the clutch $a^6$ by means of its lever $f^2$ those of the whole machine can be stopped instantly by hand.

The hollow spindle $a$ is mounted and arranged to rotate in the head-stock, and is longitudinally kept in position by means of the collar in front and nut $a^9$ at the back thereof. (See Fig. 26.) In this spindle $a$ is arranged to rotate and to be slightly slid longitudinally the bush $a^4$, which has in front grip-jaws or a cone-chuck $a^5$. In the recess or enlarged portion of the bore of the spindle $a$ is placed over the bush $a''$ a strong spring $a^3$, one end of which bears against the end of the said bore and the other end pressing against the sleeve $a^8$ of the knee-lever mechanism.

Figures 26, 27, 28:
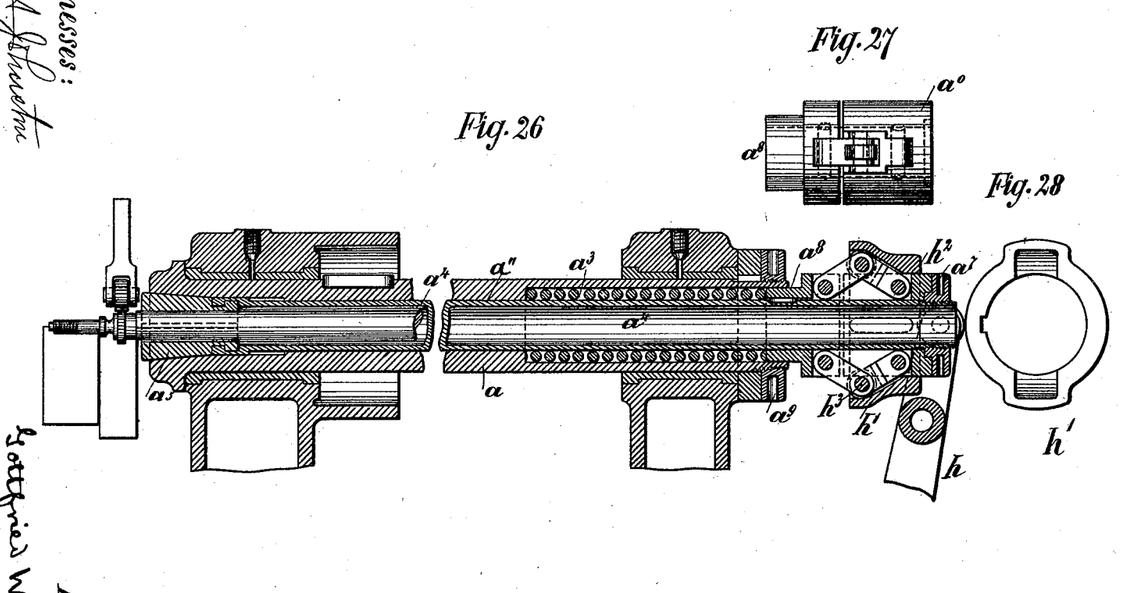
Fig. 26 is a section through the spindle which holds the object under operation on a larger scale than Fig. 11.
Figs. 27 and 28 are respectively a side view and front view of the fixing-bush in connection with the gripping arrangement.

The fixing of the cast or drawn object or rod to be operated upon takes place by means of the spring $a^3$, which, owing to its pressure on sleeve $a^8$, forces the cone-chuck $a^5$, which consists of three jaws, constantly against the coned seat in the spindle $a$. The jaws of the cone-chuck $a^5$ are connected to the tube $a^4$, which carries at its back end the fixed collar $a^9$.

In an enlargement of the bore of the spindle $a$ is placed the spring $a^3$, which with one end bears against a fixed point or support and with the other end presses on the sleeve $a^8$, which is connected to the sleeve $a^0$ by means of two knee-joints $h^3$, which sleeve $a^8$ bears against the fixed collar $a^9$. On the sleeve $a^0$ is placed the conical shell $h'$ $h^2$. The knee-joints rest in inclined recesses formed in the said shell in such a manner that the pressure of the inclined recesses onto the joint $h^3$ effects a compression of the knee, which thus causes a displacement of the sleeve $a^8$ by the sleeve $a^0$. In this position the spring $a^3$ is compressed and the jaws of the cone-chuck $a^5$ rest fast in their coned seat. A lever $h$, which always bears against the face $h^2$ of the shell $h'$, causes the displacement of the same, the whole of the organs $a^7$ $a^0$ $h^3$ $a^8$ $a^4$ $a^5$ being bound, so as to rotate therewith when the parts are set in operation.

In small machines the tensioning and releasing of the spring may be effected, for instance, by causing the lever $h$ to act direct onto the sleeve $a^8$ in lieu of being provided with the knee-lever or a power-transmitting mechanism, as described.

The part of the object or rod to be turned is guided in a gas-pipe $i^7$, which serves to guide the feeding-rod $i^6$. This pipe is split in its upper portion, and through the slit is projected a follower $i^8$, to which is connected a wire rope $i^9$, passed around a pulley $i^5$. By this means feeding-rod $i^6$ can be moved forward. To hold the object to be operated upon firmly, the eccentric $d'$, by means of the lever $h$, presses onto the face $h^2$ of the conical shell $h'$, which forces the knee-levers $h^3$ in the direction of the tube $a^4$ and the sleeve $a^8$ against the spring $a^3$, thus compressing the latter and exerting a strong pressure on the fixed collar $a^9$.

For the purpose of feeding the object to be operated upon, the return of $h'$ and $a^8$ is permitted through the lever $h$. The compression of the spring $a^3$ being reduced, the grip of the chuck $a^5$ is also accordingly diminished. The object to be operated upon, thus liberated, is pushed forward the required length by means of the eccentric $d^2$, the lever $i$, the rod $i^2$, levers $i^3$, ratchet-wheel $i^4$, and rope-pulley $i^5$, and feeding-rod $i^6$ connected with the wire rope. By adjusting the rod $i^2$ in the longitudinal slots of the levers $i$ and $i^3$ the speed of the object to be operated upon can be regulated. The reversing of the coupling $a^6$ is effected from the shaft $d$ by means of the eccentrics $d^3$ and $d^4$, the latter acting alternately on the sliding rod $f$, which is connected with the lever $f^2$, and the latter with the lever $f^{2*}$, which levers are retained in their final position by means of the spring-bolts $f^3$.

Figure 6:
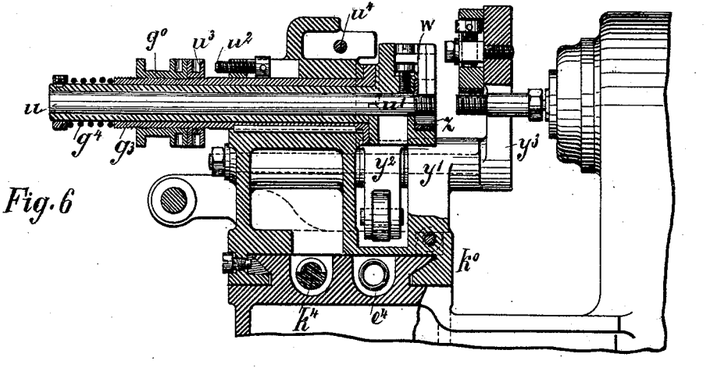
Fig. 6 is a vertical section through the screw-cutting spindle of the fixed tool-slide on a larger scale than Figs. 1 to 5.

The eccentric $d^5$, the sliding rods $g$, the spring $g^5$, and the levers $g^2$ and $g^{2*}$ serve for the forward and backward movement of screw-cutting spindle $g^3$, arranged in the fixed tool-slide $k^0$, which, by means of a key, is guided and rendered movable only longitudinally. The screw-cutting bush $u$, Fig. 6, is made to turn in the hollow spindle $g^3$ and to be drawn back to its original position each time after having performed its work by means of the light spring $g^4$. The rotary bush $u$ has a coupling-nose $u'$ bearing against another nose formed on the hollow spindle $g^2$ in such a manner that for a certain distance the bush $u$ is prevented from turning in the hollow spindle $g^3$. On the hollow spindle $g^3$ is placed the lever-collar $g^0$, with lock-nut, the face $u^3$ of which is opposite a regulating-screw $u^2$.

The rod $g$ is formed in two parts, which are kept apart by means of a strong spring $g'$, placed between the rods $g$, but which parts can be pressed toward each other. This kind of connection has for its purpose to facilitate an elastic grip of the jaws of the screw-cutting die. On the rod $g$ being pushed forward the spring $g'$ closes until the screw-die $z$ of the bush $u$ has gripped the object under operation. As soon as this has taken place, according to the pitch of the thread, the bush $u$, as well as the hollow spindle $g^3$, in consequence of the action of the spring $g^4$, advances until $u^3$ comes into contact with $u^2$. From this moment the bush $u$ moves forward by itself until the noses $u'$ slip off each other and thus liberate (in a rotary sense) the bush $u$ and spindle $g^3$. In the meantime the reversing of the speed-pulleys $a'$ and $a^2$, and thereby the rotation of the object under operation in an opposite direction, takes place. The bush $u$ would now simply rotate with the object just operated upon without being longitudinally displaced if no provisions were made to bring it back from the same. This arrangement consists of a lever $u^5$, carried by a stud $u^4$, which can escape upward and is retained in its lowest or horizontal position through the stop $u^7$.

On the screw-die head of the bush $u$ is formed an eccentric projection with an inclined and a straight surface $u^6$ in such a manner that the inclined surface on the rotation of the bush during screw-cutting comes in contact with and raises the lever $u^5$, and the straight surface, however, after the reversing comes into contact with the side of the lever $u^5$, and is thereby held in position. This causes the rotation of the bush $u$ and the object cut to be interrupted and thus move only longitudinally in accordance with the pitch of the thread, as is the case when screw-cutting, but backward until the noses $u'$ are pushed in contact with each other and the surface $u^3$ has finally returned from the regulating-screw $u^2$ to its starting-point.

By means of the screw $u^2$ the starting moment of the cutting-die and the length of the thread can be easily regulated. The moment at which $u'$ slips off causes the stopping of the screw-cutting, even without the reversing between $a'$ and $a^2$ having previously taken place.

The screw-die $z$ is radially adjustable to the object to be operated upon by means of the screw $v$, which is held by and guided in the forked part of the movable die portion $w$.

Figure 7:
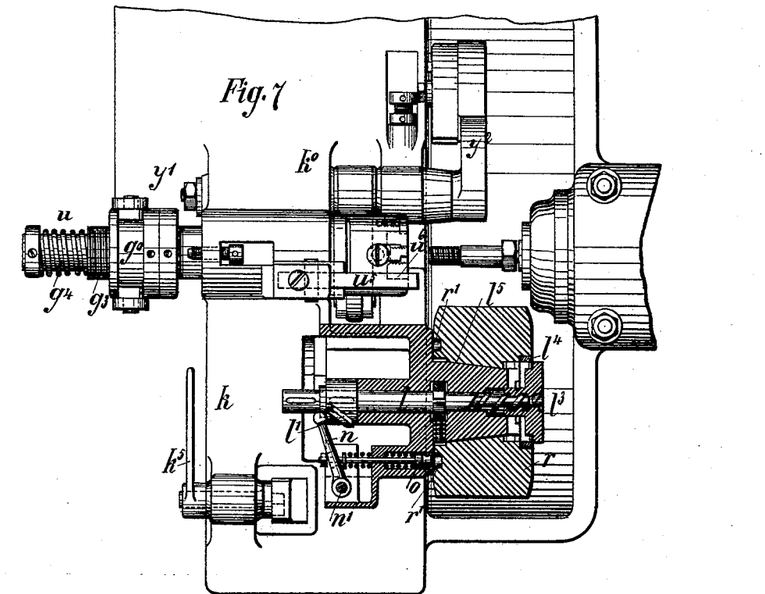
Fig. 7 is a plan thereof, showing the revolver-tool in section.
Figure 8:
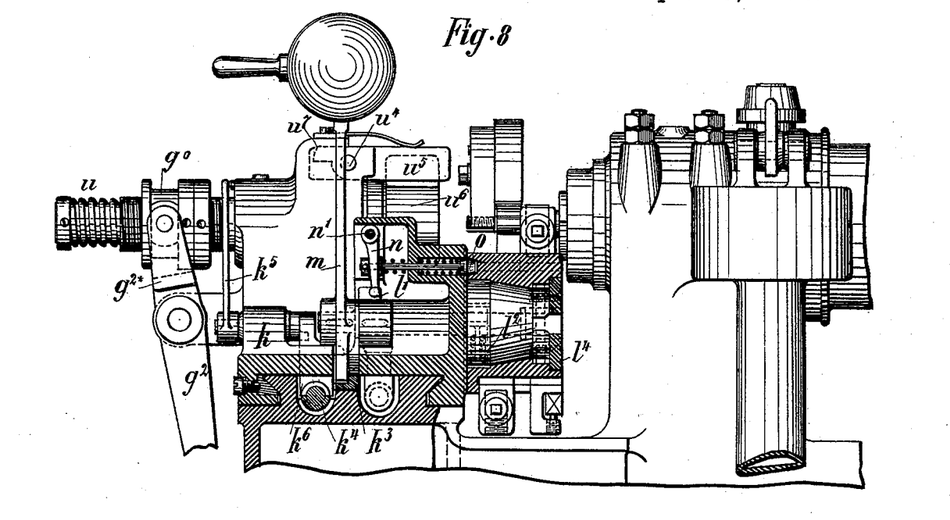
Fig. 8 is a side view of the tool-divisions, the revolver-tool being partly in vertical section.
Figures 14, 15, 16:
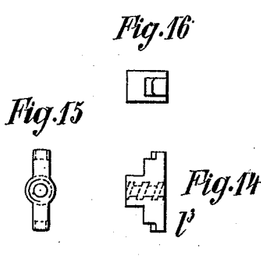

On the movable tool-slide $k$, which is positioned crosswise to and a little on one side of the main spindle $a$, is employed on a conical stud $l^5$ the revolver-tool head $r$. In the back face of the revolver $r$ are six holes $r'$, Fig. 7, into which the spring-bolt $o$ enters successively, and six teeth internally milled out, into which the spring-bolt $l^2$ successively enters, Figs. 7 and 8, and which serve to effect the partial rotation of the revolver $r$. In the front face of the latter are formed six conical slots $r^2$, Fig. 10, into which is pressed, according to the rotation of the spindle $l$, the cross-piece $l^3$, Figs. 14 to 16, formed with conical projections and quick-thread. To the head $r$ is fitted a plate $l^4$, which is screwed fast to the conical stud $l^5$, Fig. 8. The cross-piece $l^3$ is guided on its stud $l^5$ as well as in the longitudinal slot of the plate $l^4$, and can therefore in itself not assume a rotary motion. The lever $m$ is fixed on the spindle $l$. The inclined-nose $l'$, which is securely connected to the spindle $l$, facilitates the return of the spring-bolt $o$ on the return of the lever $m$ in its middle position $m'$, Fig. 11, by means of the lever $n$, movable on the stud $n'$. In the lever position $m'$, as shown in Fig. 7, the spring-bolt $o$ and the cross-piece $l^3$ are disengaged. The spring-bolt $l^2$ has now advanced to the next tooth, and the revolver $r$ is thus turned one-sixth of a revolution into lever position $m^3$.

Figures 20, 21, 22, 23, 24, 25, 29, 30, 31:
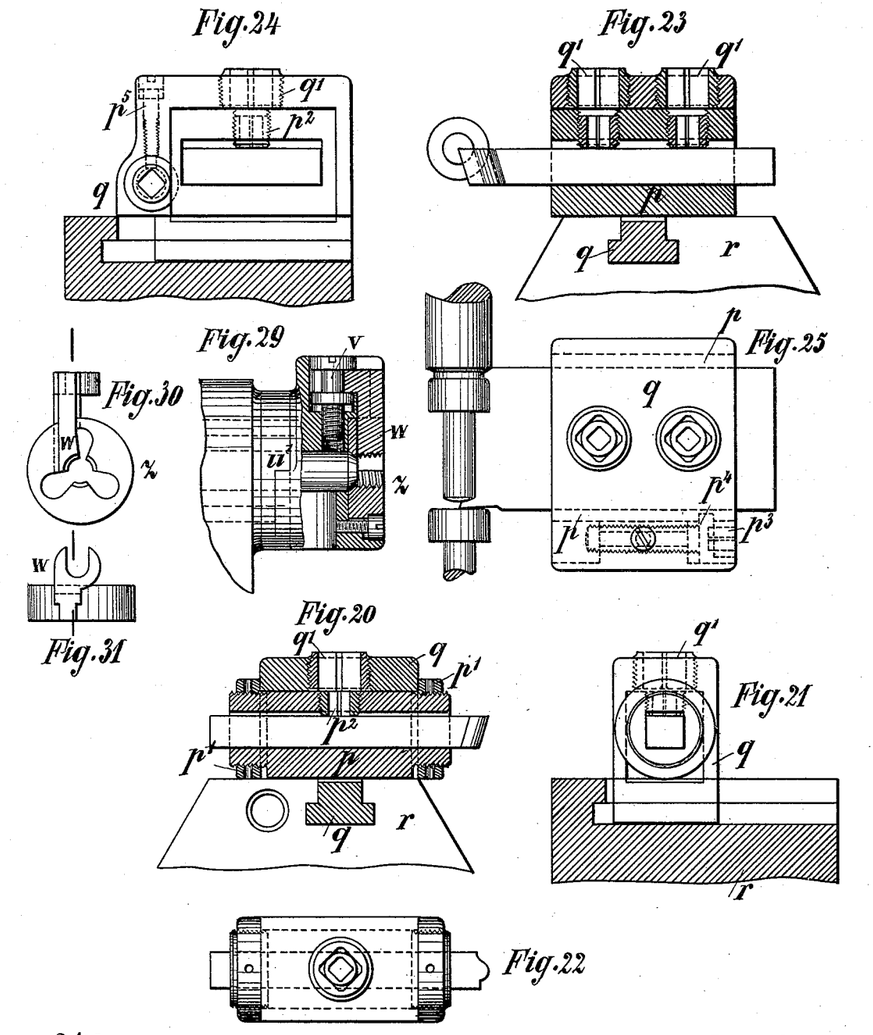
Figs. 20 to 25 are views of the two principal kinds of revolver-tools.
Fig. 29 is a section through the screw-dies.
Figs. 30 and 31 are respectively a front view and a plan of the screw-dies.

The revolver-head $r$, with six fixing-surfaces, serve for the reception of shaping-tools of the usual form and milling-tools, &c. In each of the said surfaces slots are milled, in which tool-holders capable of being regulated can be screwed fast. As shown in Figs. 20 to 22, the tool is secured in the holder $p$ by means of screws $p^2$. The tool-holder $p$ can be drawn back or pushed forward in the tool-holder box $q$ by means of the nut $p'$ when the screw $q'$ is withdrawn, and thus the whole displaced in the longitudinal slots of the revolver-disk. If an object has to receive a particular exact and good finish, the object to be shaped is first roughed out by small tools, of which one or two are secured on one of the surfaces of the revolver-disk, and afterward finished, as shown in Fig. 25, by means of a broader tool. For the broader tools the holder shown in Figs. 23 to 25 is preferably used. The regulating arrangement for the same differs a little from those for small tools.

In the tool-holder box $q$ is mounted a regulating-screw $p^3$, which has a shoulder $p^4$ engaging a groove in the tool-holder in such a manner that on screwing in the regulating-screw the tool-holder moves with it, and thus can be brought in operation. The set-screw $p^5$ serves to lock the regulating-screw $p^3$ after having once been set.

Figure 10:
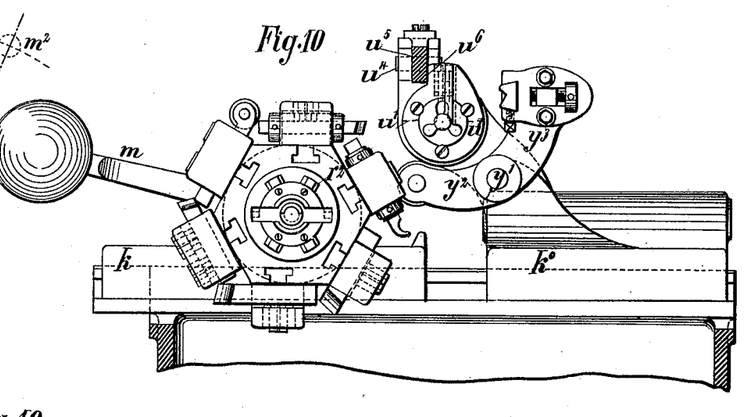
Fig. 10, Sheet III, is a back view of the tool-slides on line C D, Fig. 2, Sheet I.
Figures 11, 17, 18, 19:
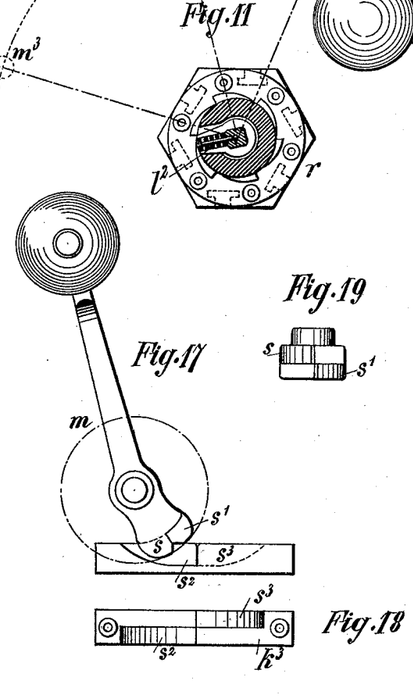
Figs. 11 to 19 are details of the revolver-tool slides.
Figures 12, 13:
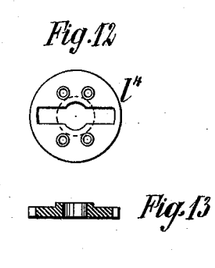

In Fig. 10 are shown on the revolver-head $r$ various tools—for instance, such as small or broad shaping-tools and a milling-tool.

Figure 2:
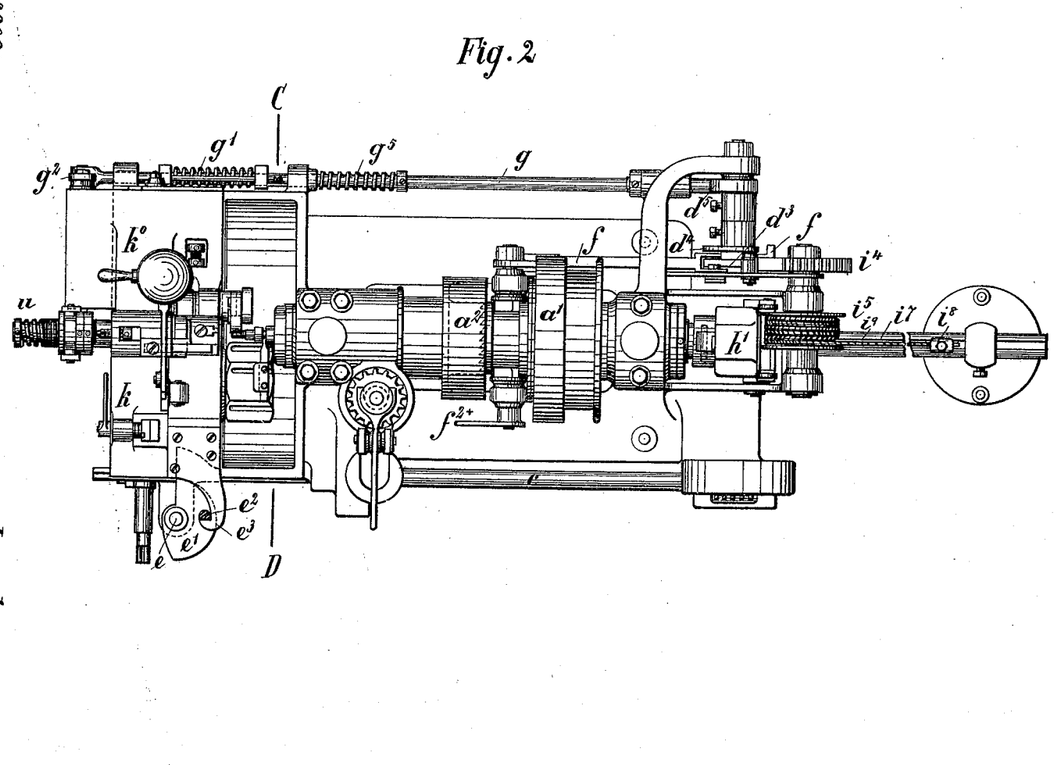
Fig. 2, a plan.
Figure 3:
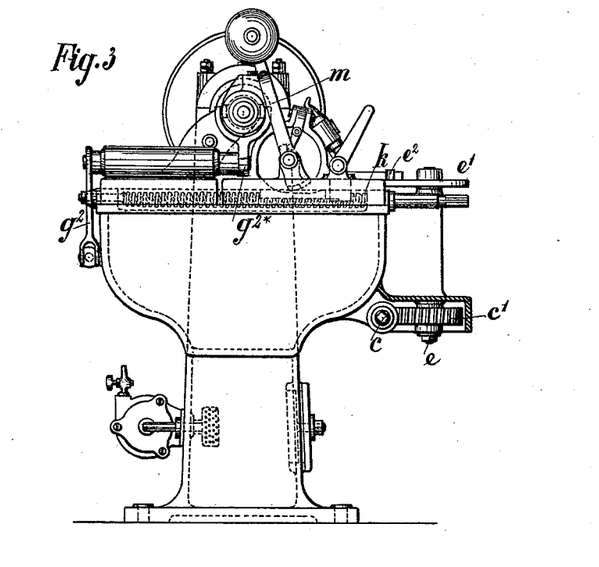
Fig. 3, a front view, and Fig. 4 a back view, of the machine.
Figure 4:
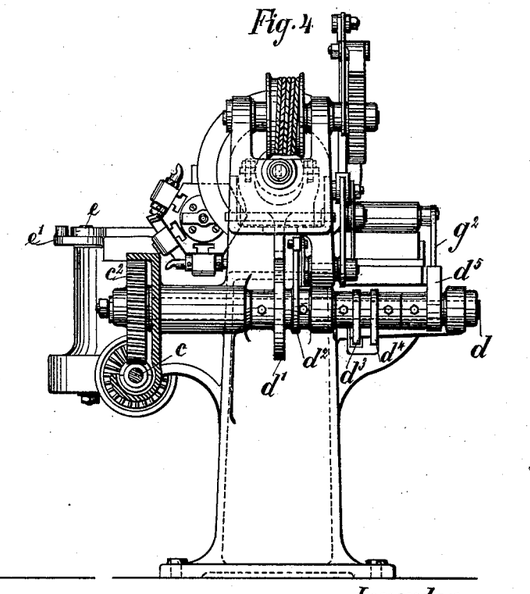
Figure 5:
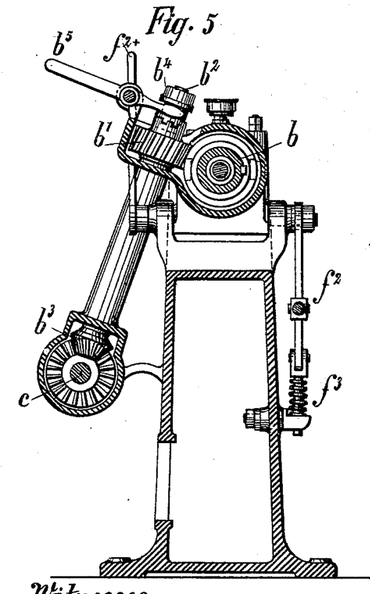
Fig. 5, Sheet II, a cross-section on line A B of Fig. 1, Sheet I.
Figure 9:
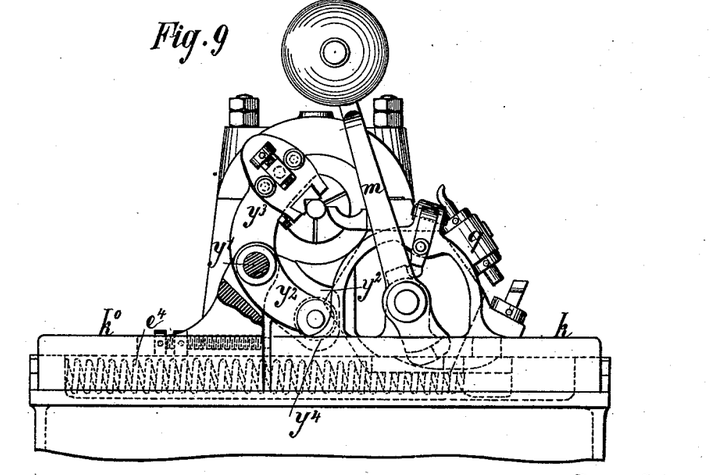
Fig. 9, Sheet I, is a front view of the tool-slides, showing specially the holders set opposite the revolver-tools.

Into the prism of the revolver-slide the steel plate $k^3$ is inserted. In the same are the two displaced slots $s^2$ and $s^3$, Figs. 3, 17, and 18, milled out, engaging the noses $s$ and $s'$, formed at the lower end of the lever $m$, one of which effects the fro and the other the to motion of the lever as soon as the slide $k$ has been pushed forward. The revolver-slide $k$ receives its motion toward the object under operation from an eccentric $e'$, Figs. 2 and 3, and at the end of the travel required is slid back by the eccentric-nose $e^2$ coming into contact with the hook $e^3$, fixed on the slide $k$, and through the spring $e^4$ in compression, Fig. 9, which presses the slide $k$ constantly against the eccentric. The advance and return movement of the slide $k$ effects at the same time also the installation of a fresh tool by the revolver-tool head $r$—namely, by throwing back the lever $m$, provided with noses $s$ and $s'$.

The slide-spindle $k^4$ serves for the adjustment and setting of the slide $k$ to the object under operation.

The nut $k^6$, arranged to be put out and in gear, serves to disconnect or connect the slide $k$ with the screw-spindle $k^4$. This takes place by means of the lever $k^5$ and a suitable eccentric, which raises the nut $k^6$ out of and lowers it into the thread.

To prevent the bending of the object under operation, the following provisions are made: Opposite to the slide $k$, which moves by each change of tools, (one-sixth revolution of that of the revolver-head,) is set on the same slide-prism the relative fixed slide $k^9$. On the stud $y'$, Figs. 6 to 10, of the fixed slide is arranged to turn the double lever $y^2$ $y^3$, the lower arm $y^2$ of which enters a cam-recess terminating below and above in nose-surfaces. The upper arm $y^3$ carries the counter-holder block. The cam-recess $y^4$ is of such a form so as to cause the holder to move toward the center of the object in accordance with the amount of forward movement of the turning-tool. On the return of the slide $k$ this lower cam-recess nose-surface raises the lever $y^2$ until the counter-holder $y^3$ falls back, which on the forward movement of the slide $k$, by reason of the action of the upper cam-recess nose-surface on the lever $y^2$, raises the lever $y^3$ again and brings the counter-holder simultaneously with the tool against the object under operation.

Having now particularly described and ascertained the nature of this invention and in what manner the same is to be performed, I declare that what I claim is—

1. A tool-holder with polygonal revolver-head the sides of which serve for the reception of turning and other tools with adjustable tool-holder, substantially as set forth.

2. A tool-holder with polygonal revolver-head the sides of which are slotted for the reception of the tools and the bore of which is provided with ratchet-divisions corresponding with the number of the revolver-head sides, substantially as set forth.

3. In a polygonal revolver-head the sides of which are furnished with tools, the spring-bolt lever $l^2$, fixed on the central spindle, the spring-bolt of which acts on an internal ratchet-wheel of the revolver-head, thus feeding the latter internally, substantially as set forth.

4. In a polygonal revolver-head the sides of which are furnished with tools, the spring-bolt $o$, the points of which enter a recess milled into the back rotary face of the revolver-head, which, (for instance, as shown, by the aid of a lever $n$,) by means of an inclined surface or nose $l'$, fixed on the central spindle $l$ of the revolver-head, is drawn back and then released at a convenient moment, substantially as set forth.

5. In a polygonal revolver-head the sides of which are furnished with tools, the plate $l^4$, connected to the fixed stud $l^5$, (of the slide $k$,) which is positioned concentrically in the revolver-head and in which the cross-piece $l^3$ is guided in such a manner that after the entrance of the spring-bolt $o$ and on the continued rotation of the central spindle screwed into the cross-piece $l^3$ the latter, by reason of the pressure exerted by its conical noses on the revolver, presses the latter on its conical stud $l^5$, thereby retaining it in position, substantially as set forth.

6. A slide $k$, having a fixed conical stud $l^5$, which latter carries a polygonal revolver-head $r$, with eccentric $e'$, which presses the slide against the action of the spring $e^4$ forward, and thereby the tools of the revolver-head against the object under operation, and with an eccentric-stud $e^2$, which withdraws the slide $k$ with the revolver-tools from the object under operation, substantially as set forth.

7. A movable slide $k$, having a fixed conical stud $l^5$, which latter carries a polygonal revolver-head $r$, central spindle $l$, on which is screwed the cross-piece $l^3$, and lever $m$, with noses $s$ and $s'$, which enter the recesses $s^2$ and $s^3$ of the fixed prism for the purpose of changing the revolver-tools, substantially as set forth.

8. A movable slide $k$, furnished with the cam-recess $y^4$, having a fixed conical stud $l^5$, with polygonal revolver-head $r$, in combination with a fixed slide $k^0$, which carries on a stud $y'$ a double lever $y^2$ and $y^3$, the arm $y^3$ of which carries a counter-holder block which presses against the object under operation exactly according to the advance of the revolver-tool slide through the motion of the lever-arm $y^2$ in the cam-recess $y^4$, substantially as set forth.

9. The tool-holder $p$, made adjustable by means of nuts $p'$ in the tool-box $q$, which is made adjustable parallel to the axis of the object under operation in slots of the polygonal tool-head, substantially as set forth.

10. The tool-holder $p$ in the tool-box $q$, which in the slots of the polygonal tool-head is made adjustable parallel to the object under operation, with a screw $p^3$ mounted in the tool-box $q$, the collar $p^4$ of which screw runs in a groove of the tool-holder and which serves for the adjustment of the tool-holders, substantially as set forth.

11. In a screw-cutting arrangement of an automatic machine for the manufacture of screws, knobs, and the like, the horizontally-positioned upward-moving lever-arm $u^5$, mounted on the stud $u^4$ for the purpose of preventing the rotation of the bush $u$ with the object under operation on its rotary movement being reversed, substantially as set forth.

12. In a screw-cutting arrangement of an automatic machine for the manufacture of screws, knobs, and the like, the lever-arm $u^5$, in combination with a screw-cutting bush $u\,u^6$, which is furnished with a coupling-nose $u'$, which comes in and out of gear with the hollow spindle $g^3$, substantially as set forth.

13. In an automatic machine for the manufacture of screws, knobs, and the like, the screw-cutting die $w$, which is made adjustable in the head of the bush $u$ by means of the screw $v$, mounted therein, substantially as set forth.

14. In an automatic machine for the manufacture of screws, knobs, and the like from rods, the rotating spindle $a$, with cone-chuck $a^5$, tube $a^4$, and spring $a^3$, which presses against a sleeve $a^8$, which is fed and moved from an eccentric $d'$ by means of a lever $h$, substantially as set forth.

15. In an automatic machine for the manufacture of screws, knobs, and the like, the rotating spindle $a$, with cone-chuck $a^5$, tube $a^4$, and spring $a^3$, movable sleeve $a^8$, knee-joint $h^3$, fixed sleeve $a^0$, with or without collar $a^7$, and with a conical shell $h'$ $h^2$ pressing against the surface of the lever $h$, substantially as set forth.

16. In an automatic machine for the manufacture of screws, knobs, and the like, the mechanism for the feeding of the object to be operated upon placed inside the slotted gas-pipe $i^7$, consisting of a lever $i$, acted upon by an eccentric, the rod $i^2$, lever $i^3$, feeding arrangement $i^4$, and rope with guide-piece, which pushes the object under operation in front of it, substantially as set forth.

17. An automatic machine for the manufacture of screws, knobs, and the like, consisting, essentially, of the rotary spindle $a$, with speed-pulleys $a'$ and $a^2$, coupling $a^6$, and worm $b$, worm-wheel $b'$, gearing $b^3$, shaft $c$, worm-wheel gearing $c'$, shaft $e$, with eccentric organ $e'$ $e^2$, for the purpose of driving the revolver-slide $k$, worm-wheel gearing $c^2$ for the shaft $d$ of the eccentrics $d'$ to $d^5$ for the compression of the spring $a^3$ for the purpose of feeding the object under operation, for reversing the speed-pulleys, and for the reversing motion of the screw-cutting bush, substantially as set forth.

In testimony whereof I affix my signature in presence of two witnesses.

GOTTFRIED WÜST-GUYER.

Witnesses:
H. RABHART,
EMIL BLUM.